US011309597B2

(12) United States Patent
Saroka et al.

(10) Patent No.: US 11,309,597 B2
(45) Date of Patent: Apr. 19, 2022

(54) BATTERY TEMPERATURE CONTROL

(71) Applicant: Carrier Corporation, Palm Beach Gardens, FL (US)

(72) Inventors: Mary D. Saroka, Syracuse, NY (US); Jeffrey J. Burchill, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 378 days.

(21) Appl. No.: 16/244,610

(22) Filed: Jan. 10, 2019

(65) Prior Publication Data

US 2019/0214691 A1 Jul. 11, 2019

Related U.S. Application Data

(60) Provisional application No. 62/616,077, filed on Jan. 11, 2018.

(51) Int. Cl.

| | |
|---|---|
| ***H01M 10/613*** | (2014.01) |
| ***H01M 10/6551*** | (2014.01) |
| ***H01M 10/643*** | (2014.01) |
| ***B60H 1/00*** | (2006.01) |
| ***H01M 10/625*** | (2014.01) |
| ***H01M 10/6556*** | (2014.01) |
| ***B60H 1/32*** | (2006.01) |
| ***H01M 50/20*** | (2021.01) |

(52) U.S. Cl.

CPC ...... *H01M 10/613* (2015.04); *B60H 1/00278* (2013.01); *B60H 1/00378* (2013.01); *B60H 1/3232* (2013.01); *H01M 10/625* (2015.04); *H01M 10/643* (2015.04); *H01M 10/6551* (2015.04); *H01M 10/6556* (2015.04); *H01M 50/20* (2021.01); *B60H 2001/003* (2013.01)

(58) Field of Classification Search

CPC ........................ H01M 10/6554; H01M 50/213

See application file for complete search history.

(56) References Cited

U.S. PATENT DOCUMENTS

| | | | | |
|---|---|---|---|---|
| 6,087,038 | A | 7/2000 | Flament et al. | |
| 6,106,972 | A | 8/2000 | Kokubo et al. | |
| 6,224,997 | B1 * | 5/2001 | Papadopoulos ....... | H01M 2/105 429/157 |
| 6,255,015 | B1 | 7/2001 | Corrigan et al. | |
| 6,340,877 | B1 * | 1/2002 | Mita ..................... | H01M 2/105 320/112 |
| 6,512,347 | B1 | 1/2003 | Hellmann et al. | |
| 6,797,427 | B2 | 9/2004 | Maleki et al. | |
| 7,141,331 | B2 | 11/2006 | Ziegler et al. | |
| 7,270,910 | B2 | 9/2007 | Yahnker et al. | |
| 7,597,993 | B2 | 10/2009 | Glauning et al. | |
| 8,273,474 | B2 | 9/2012 | Al-Hallaj et al. | |
| 8,568,915 | B2 | 10/2013 | Fuhr et al. | |
| 8,568,918 | B2 | 10/2013 | Schroeter et al. | |
| 8,609,274 | B2 | 12/2013 | Paolazzi et al. | |
| 8,734,977 | B2 | 5/2014 | Lee et al. | |
| 9,276,295 | B2 | 3/2016 | Muis | |
| 9,614,263 | B2 | 4/2017 | Vang et al. | |
| 9,774,065 | B2 | 9/2017 | Deng et al. | |
| 2002/0177035 | A1 | 11/2002 | Oweis et al. | |
| 2006/0113965 | A1 | 6/2006 | Jeon et al. | |
| 2008/0124623 | A1 | 5/2008 | Hisamitsu et al. | |
| 2009/0004558 | A1 * | 1/2009 | Miyazaki ............ | H01M 2/0225 429/159 |
| 2009/0111015 | A1 | 4/2009 | Wood et al. | |
| 2013/0248165 | A1 * | 9/2013 | Kandasamy ....... | B60H 1/00428 165/271 |
| 2015/0200430 | A1 | 7/2015 | Allmann et al. | |
| 2018/0323412 | A1 * | 11/2018 | Ryu ...................... | H01M 50/20 |

FOREIGN PATENT DOCUMENTS

| | | | | |
|---|---|---|---|---|
| CN | 102074767 | | | 5/2011 |
| CN | 103545571 | | | 1/2014 |
| EP | 1026770 | B1 | | 9/2006 |
| FR | 3034261 | A1 | | 9/2016 |
| JP | 2001-148235 | | * | 5/2001 |
| JP | 2012-190716 | | * | 10/2012 |
| JP | 2014-203766 | | * | 10/2014 |
| WO | 2008034584 | A1 | | 3/2008 |
| WO | WO 2017/217643 | | * | 12/2017 |

OTHER PUBLICATIONS

Machine translation of JP2001-148235, published on May 29, 2001 (Year: 2001).*

Machine translation of JP 2012-190716, published on Oct. 4, 2012 (Year: 2012).*

Machine translation of JP 2014-203766, published on Oct. 27, 2014 (Year: 2014).*

* cited by examiner

*Primary Examiner* — Anca Eoff

(74) *Attorney, Agent, or Firm* — Cantor Colburn LLP

(57) ABSTRACT

A battery case is provided. The battery case includes a first fin and a second fin, wherein the first fin is stacked substantially parallel to the second fin. The first fin is separated from the second fin by an airgap. The battery case includes one or more battery cell packs, each of the one or more battery cell packs are disposed through an orifice on each the first fin and the second fin.

10 Claims, 7 Drawing Sheets

BATTERY TEMPERATURE CONTROL

CROSS-REFERENCE TO RELATED APPLICATIONS

This application claims the benefit of U.S. patent application Ser. No. 62/616,077 filed Jan. 11, 2018, which is incorporated herein by reference in its entirety.

BACKGROUND

Exemplary embodiments pertain to the art of batteries and more particularly to a power battery housing.

Trailer refrigeration units (TRUs) are containers designed to carry perishable freight at a specific temperature or within a temperature range. TRUs can be equipped with a variety of refrigeration systems for maintaining a specific temperature within the cabin. Typically, a diesel engine driven trailer refrigeration unit is utilized for keeping fresh, frozen foods and other goods during transport. However, problems exist with these diesel engine TRUs such as, for example, fuel costs, harmful exhaust emissions, particular matter, and noise pollution. To address the above problems, electric TRUs are utilizing power sources such as battery power. However, battery power includes problems related to environmental conditions on the battery that can affect battery performance and thus refrigeration system performance.

BRIEF DESCRIPTION

According to one embodiment, a battery case is provided. The battery case includes a first fin and a second fin, wherein the first fin is stacked substantially parallel to the second fin. The first fin is separated from the second fin by an airgap and the first fin. The battery case includes one or more battery cell packs, each of the one or more battery cell packs are disposed through an orifice on each of the first fin and the second fin.

In addition to one or more of the features described above, or as an alternative, further embodiments of the battery case may include a third fin, wherein the third fin is stacked substantially parallel to the first fin and the second fin. The third fin is separated from the first fin and the second fin by an airgap. Each of the one or more battery cell packs are disposed through an orifice on the third fin.

In addition to one or more of the features described above, or as an alternative, further embodiments of the battery case may include that each of the one or more battery cell packs comprise a cylindrical housing, wherein a plurality of battery cells are arranged in the cylindrical housing.

In addition to one or more of the features described above, or as an alternative, further embodiments of the battery case may include that the orifice is substantially cylindrical and sized to receive a battery cell pack.

In addition to one or more of the features described above, or as an alternative, further embodiments of the battery case may include that the first fin and the second fin comprise a metal.

In addition to one or more of the features described above, or as an alternative, further embodiments of the battery case may include that the metal is aluminum.

In addition to one or more of the features described above, or as an alternative, further embodiments of the battery case may include that the first fin and the second fin comprise an aluminum alloy.

In addition to one or more of the features described above, or as an alternative, further embodiments of the battery case may include two or more battery cell packs disposed through a second orifice on each of the first fin and the second fin.

In addition to one or more of the features described above, or as an alternative, further embodiments of the battery case may include one or more support members affixed to each of the first fin and the second fin.

According to one embodiment, a trailer refrigeration unit is provided. The trailer refrigeration unit includes a refrigeration system including at least one compressor, an evaporator, a plurality of battery cell packs, and at least one fan. A microcontroller circuit configured to operate the refrigeration system is included. The trailer refrigeration unit includes a battery system providing power to one or more of the compressor, the evaporator, and the at least on fan, the battery system including a first fin and a second fin, wherein the first fin is stacked substantially parallel to the second fin. The first fin is separated from the second fin by an airgap. A first battery cell pack of the plurality of battery cell packs is disposed through an orifice on each of the first fin and the second fin.

In addition to one or more of the features described above, or as an alternative, further embodiments of the trailer refrigeration unit may include that the battery system further comprises a third fin, wherein the third fin is stacked substantially parallel to the first fin and the second fin. The third fin is separated from the first fin. The first battery cell pack is disposed through an orifice on the third fin.

In addition to one or more of the features described above, or as an alternative, further embodiments of the trailer refrigeration unit may include that the battery system further comprises one or more support members affixed to each of the first fin and the second fin.

In addition to one or more of the features described above, or as an alternative, further embodiments of the trailer refrigeration unit may include an environmental sensor operable to collect an environmental parameter in the trailer refrigeration unit.

In addition to one or more of the features described above, or as an alternative, further embodiments of the trailer refrigeration unit may include that the at least one fan is operable to move air towards the battery housing based at least in part on the environmental parameter.

In addition to one or more of the features described above, or as an alternative, further embodiments of the trailer refrigeration unit may include that the first battery cell pack comprises a cylindrical housing, wherein a plurality of battery cells are arranged in the cylindrical housing.

In addition to one or more of the features described above, or as an alternative, further embodiments of the trailer refrigeration unit may include that the first orifice is substantially cylindrical and sized to receive the first battery cell pack.

In addition to one or more of the features described above, or as an alternative, further embodiments of the trailer refrigeration unit may include that the first fin and the second fin comprise a metal.

In addition to one or more of the features described above, or as an alternative, further embodiments of the trailer refrigeration unit may include that the metal is aluminum.

In addition to one or more of the features described above, or as an alternative, further embodiments of the trailer refrigeration unit may include a second battery cell pack and a third battery cell pack of the plurality of battery cell packs disposed through a second orifice on each of the first fin and the second fin.

In addition to one or more of the features described above, or as an alternative, further embodiments of the trailer refrigeration unit may include that the first fin and the second fin are in thermal contact with the battery cell pack.

BRIEF DESCRIPTION OF THE DRAWINGS

The following descriptions should not be considered limiting in any way. With reference to the accompanying drawings, like elements are numbered alike.

DETAILED DESCRIPTION

Turning now to an overview of technologies that are more specifically relevant to aspects of the disclosure, trailer refrigeration units (TRUs) are containers designed to carry perishable freight at a specific temperature or within a temperature range. TRUs can be equipped with a variety of refrigeration systems for maintaining a specific temperature within the cabin. Typically, a diesel engine driven trailer refrigeration unit is utilized for keeping fresh, frozen foods and other goods during transport. However, problems exist with these diesel engine TRUs such as, for example, fuel costs, harmful exhaust emissions, particle matter, and noise pollution.

Turning now to an overview of the aspects of the disclosure, one or more embodiments of the disclosure address the above-described shortcomings of the prior art by providing a power battery module to power TRUs or other types of refrigeration systems. The power battery modules described herein utilize lithium ion battery cells. These battery modules have battery cells arranged within to provide sufficient voltage to a refrigeration system. With lithium ion battery cells, cell ambient conditions (e.g., room temperature, humidity, etc.) affect the battery cell performance and the life of the battery cell. Lithium ion batteries can experience thermal runaway resulting in overheating.

Figure 1A:
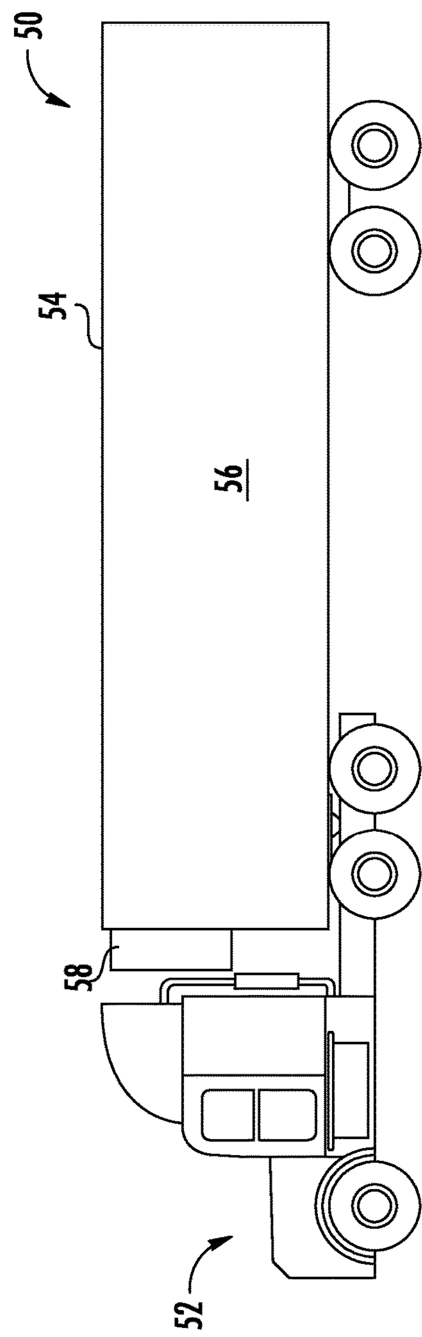
FIG. 1A depicts a transport refrigeration unit in an exemplary embodiment.

Turning now to a more detailed description of aspects of the present disclosure, FIG. 1A depicts a transport refrigeration system 50 having a refrigerated trailer. The trailer may be pulled by a tractor 52. The exemplary trailer includes a container 54 defining an interior compartment 56. It is understood that embodiments described herein may be applied to shipping containers that are shipped by rail or sea, without use of a tractor 52. An equipment housing 58 mounted to a front of the container 54 may contain a power supply. A refrigeration system may be electrically coupled to the power supply to receive electrical power. Refrigeration system includes a compressor, condenser, expansion valve and one or more evaporators defining a refrigeration circuit for circulating a refrigerant, as known in the art. Refrigeration system also includes one or more fans, such as a condenser fan, evaporator fan or ventilation fan.

Figure 1B:
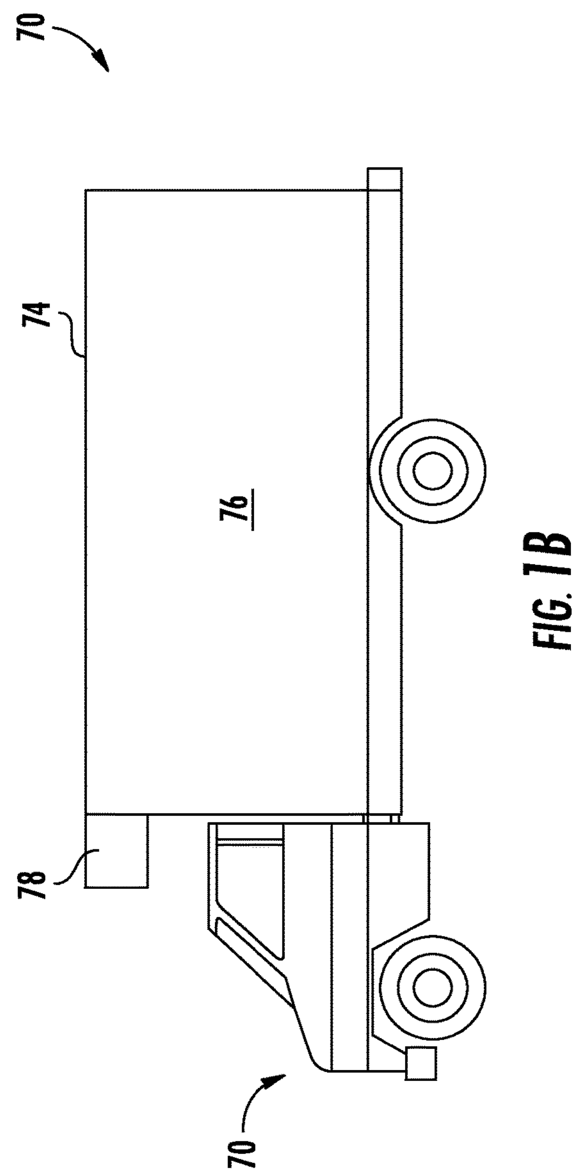
FIG. 1B depicts a transport refrigeration system as part of a truck according to one or more embodiment.

FIG. 1B depicts a transport refrigeration system as part of a truck according to one or more embodiments. The truck 70 can have an attached cargo box 74. The attached cargo box 74 defines an interior compartment 76. An equipment housing 78 can be mounted to a front of the cargo box 74 or to the top of the truck 70 in one or more embodiments. The equipment housing 78 can include a power supply and a refrigeration system electrically coupled to the power supply.

Figure 2:
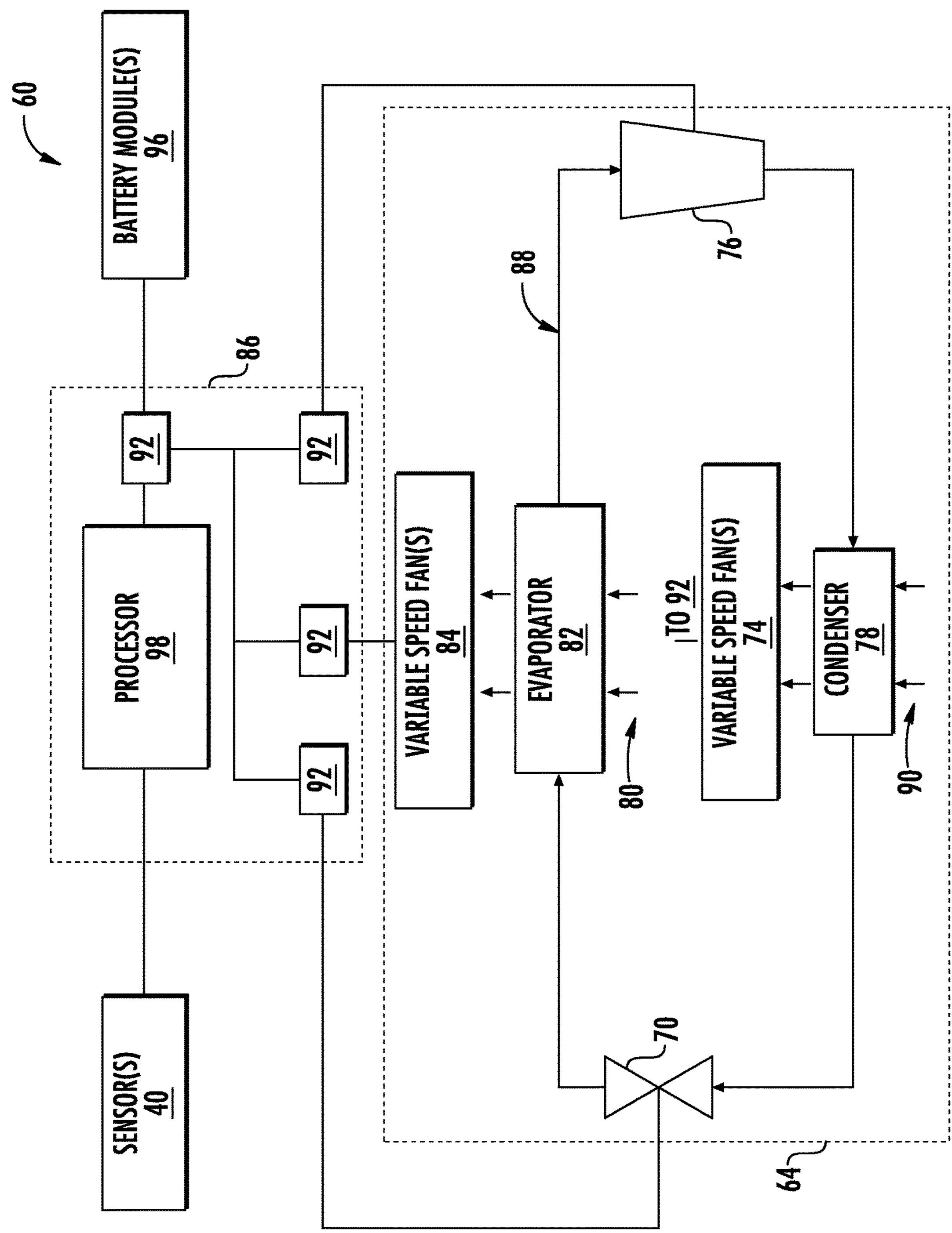
FIG. 2 depicts a diagrammatic illustration of an embodiment of a refrigeration unit.

A diagrammatic illustration of an embodiment of a refrigeration system 60 is shown in FIG. 2. The refrigeration system 60 includes a battery module 96, a refrigeration unit 64 configured with a compressor 78, a condenser 82, a refrigerant regulator 70, an evaporator 82, at fans 74, 84, and a control system 86 ("controller"). The refrigeration unit 64 is configured such that refrigerant travels through the compressor 76, the condenser 78, the refrigerant regulator 70 and the evaporator 82 in a closed loop path 88. The fan 84 has an alternating current ("ac") motor or a direct current ("dc") motor and is configured to condition air 80 from the interior compartment 56 in FIG. 1, and/or in some embodiments from outside the interior compartment 56 in FIG. 1, through the evaporator 82, and back into the interior compartment 56 in FIG. 1. The fan 74 has an alternating current ("ac") motor or a direct current ("dc") motor and is configured to move outside air 90, through the condenser 78, in order to reject heat out of the refrigeration system.

The battery module 96 is adapted to supply power to one or more of the components of the refrigeration unit 64 (e.g. the compressor 76, the refrigerant regulator 70, the fan 84, the fan 74, the controller 98, etc.). The battery module 96 is dedicated to the refrigeration unit 64. The term "dedicated" is used to indicate that the refrigeration unit 64 derives all or substantially all of its power from the battery module 96. The battery module 96 may be a single unit or multiple units combined.

The controller 86 includes a processor 98 that is adapted to receive one or more feedback signals from one or more sensors 40, positioned within the interior compartment and/or the refrigeration unit 64, indicative of an environmental parameter (e.g., temperature, pressure, humidity, etc.) within the interior compartment, and/or feedback signals indicative of operating parameters of the refrigeration unit 64. The environmental parameter can also be collected from the ambient environment around the battery module 96 which can be within the interior compartment and/or outside the interior compartment. The processor 98 is further adapted to selectively maintain or change the operating mode of the refrigeration unit 64, using actuators 92 (e.g., switches, valves, etc.) in communication with the refrigeration unit 64 based on the feedback signals, an algorithm, or some combination thereof. For example, a temperature value sensed within the interior compartment may prompt the controller 86 to engage a non-operating refrigeration unit 64 to supply cooling air to the interior compartment, or it may prompt the controller 86 to disengage an operating refrigeration unit 64. Similarly, an operating parameter value associated with the refrigeration unit 64 may prompt the controller 86 to engage a dormant refrigeration unit 64, or to disengage an operating refrigeration unit 64. It should be noted that the functionality of the processor 98 may be implemented using hardware, software, firmware, or a combination thereof.

Figure 3:
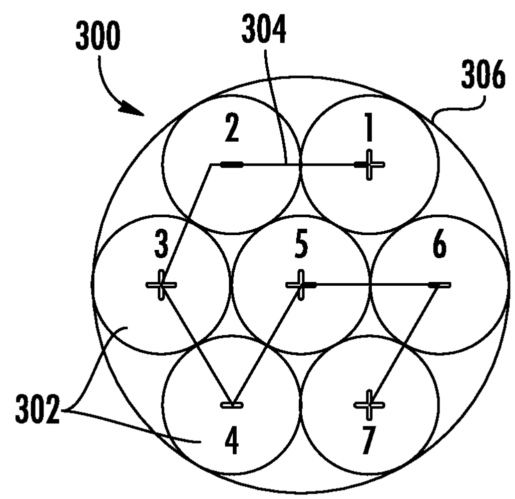
FIG. 3 depicts a cell pack according to one or more embodiments.

FIG. 3 depicts a cell pack 300 according to one or more embodiments. The cell pack 300 includes a cylindrical housing 306 with one or more battery cells 302 arranged within the cylindrical housing 306. The one or more battery cells 302 can be any type of rechargeable battery such as, for example, standard 18650 cylindrical lithium-ion cells. The cylindrical housing 306 can include seven battery cells 302 connected in series to achieve a cell pack voltage. Utilizing seven standard 18650 cylindrical lithium-ion cells in the cell pack 300, a cell pack voltage between 24 V and 27 V can be achieved. The battery cells 302 are electrically connected 304 in series as illustrated in FIG. 3 and enclosed within the housing 306 for extra containment in the event of thermal runaway of a cell or cells, to prevent cascading to other cell packs 300 that may be in proximity.

Figure 4:
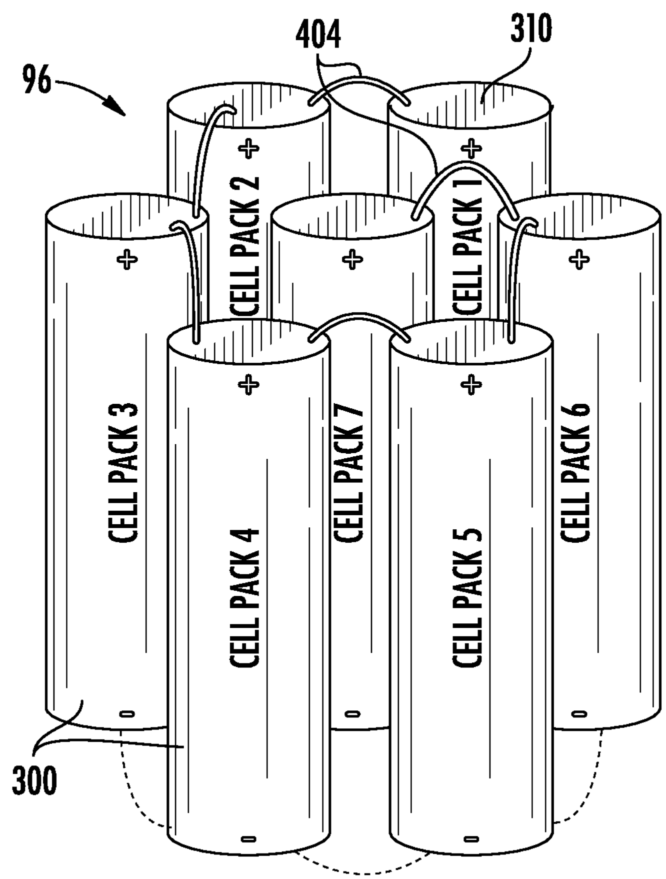
FIG. 4 depicts an arrangement of cell packs that make up a battery module according to one or more embodiments.

FIG. 4 depicts an arrangement of cell packs 300 that make up a battery module 96 according to one or more embodiments. The cell packs 300 are connected 404 electrically in parallel to produce a battery module capacity. For example, with seven cell packs 300 utilizing standard 18650 cylindrical lithium-ion cells and the cell packs 300 connected in parallel, the battery module capacity can be between 526 Wh and 635 Wh. As described herein, for a trailer refrigeration unit (TRU) refrigeration system, 12 to 16 battery modules can be connected in series to increase the total available voltage for use in operation of the refrigeration system. Monitoring of the voltage, current, state-of-charge, and temperature of cells can be accomplished by a combination of sensors, controllers, and the like on each of the battery cell packs as shown in a printed circuit board embodiment, 310.

Figure 5:
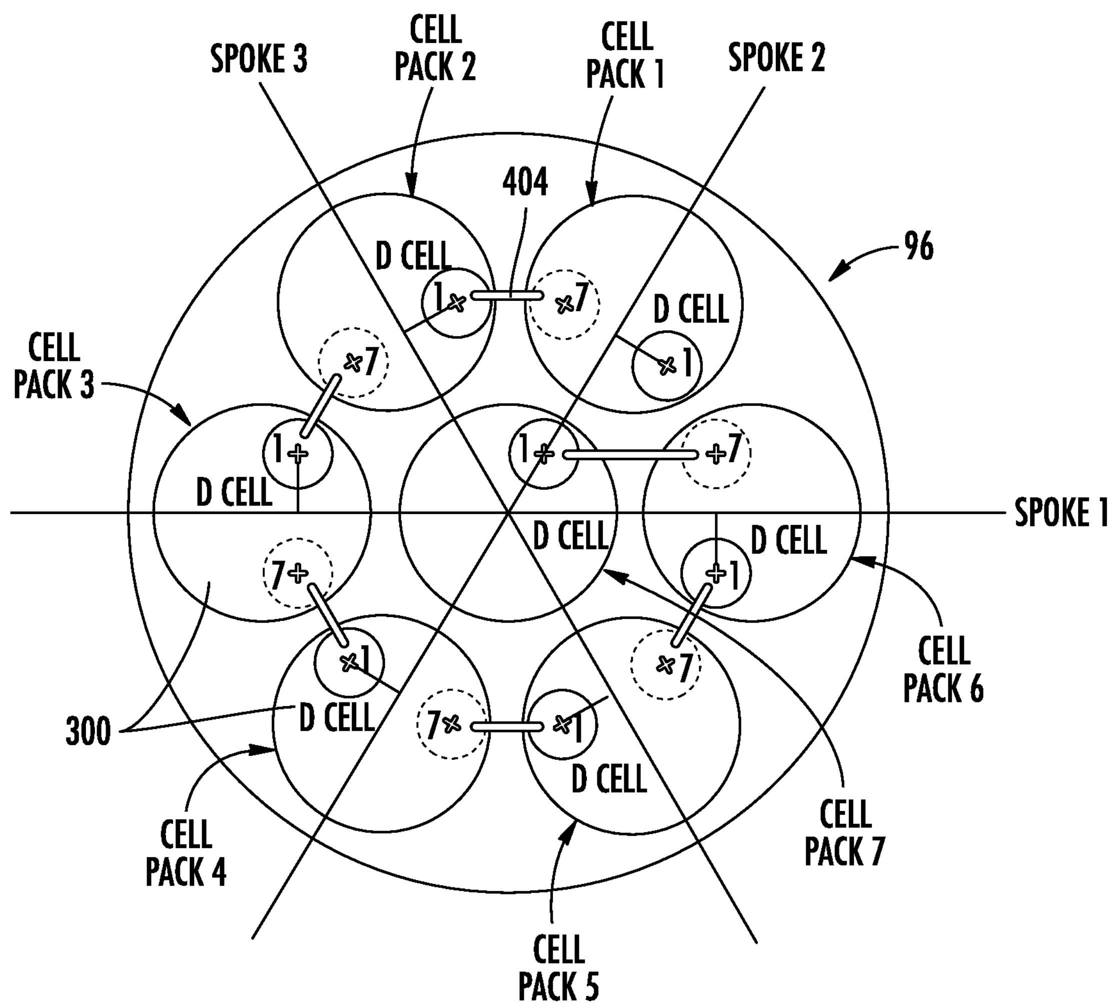
FIG. 5 depicts an orientation of cell packs within a battery module according to one or more embodiments.

FIG. 5 depicts an orientation of cell packs 300 within a battery module 96 according to one or more embodiments. The illustrated orientation of the cell packs 300 minimizes the parallel electrical connections, 404, between cell pack 1 through cell pack 6. Cell pack 7 is located in the center (i.e. where the spoke lines intersect) and is oriented such that cell 7 (in the cell pack) is located on spoke 2 at a distance of 1 cell diameter from the center. Orienting the cell packs according to this configuration provides the smallest footprint for the seven cells while optimizing the assembly cost due to the shortest possible parallel connections between cell packs 1 through 6. Other configurations are possible that do not specifically optimize the parallel connections between cell packs, but do none the less, meet the electrical performance as designed.

Technical benefits of this orientation include minimizing the electrical connections between the cell packs, so main benefit is material cost savings. That said shorter electrical connections are less likely to fail than longer connections. Also, note this orientation is only good for a circular configuration as shown in the figure. Note that in FIG. 7 we depict a rectangular configuration—as it more situated to this integration need (see last slide in figure file). In this embodiment the orientation is not optimize and mimics tubes in an evaporator or condenser coil/heat exchanger.

Figure 6:
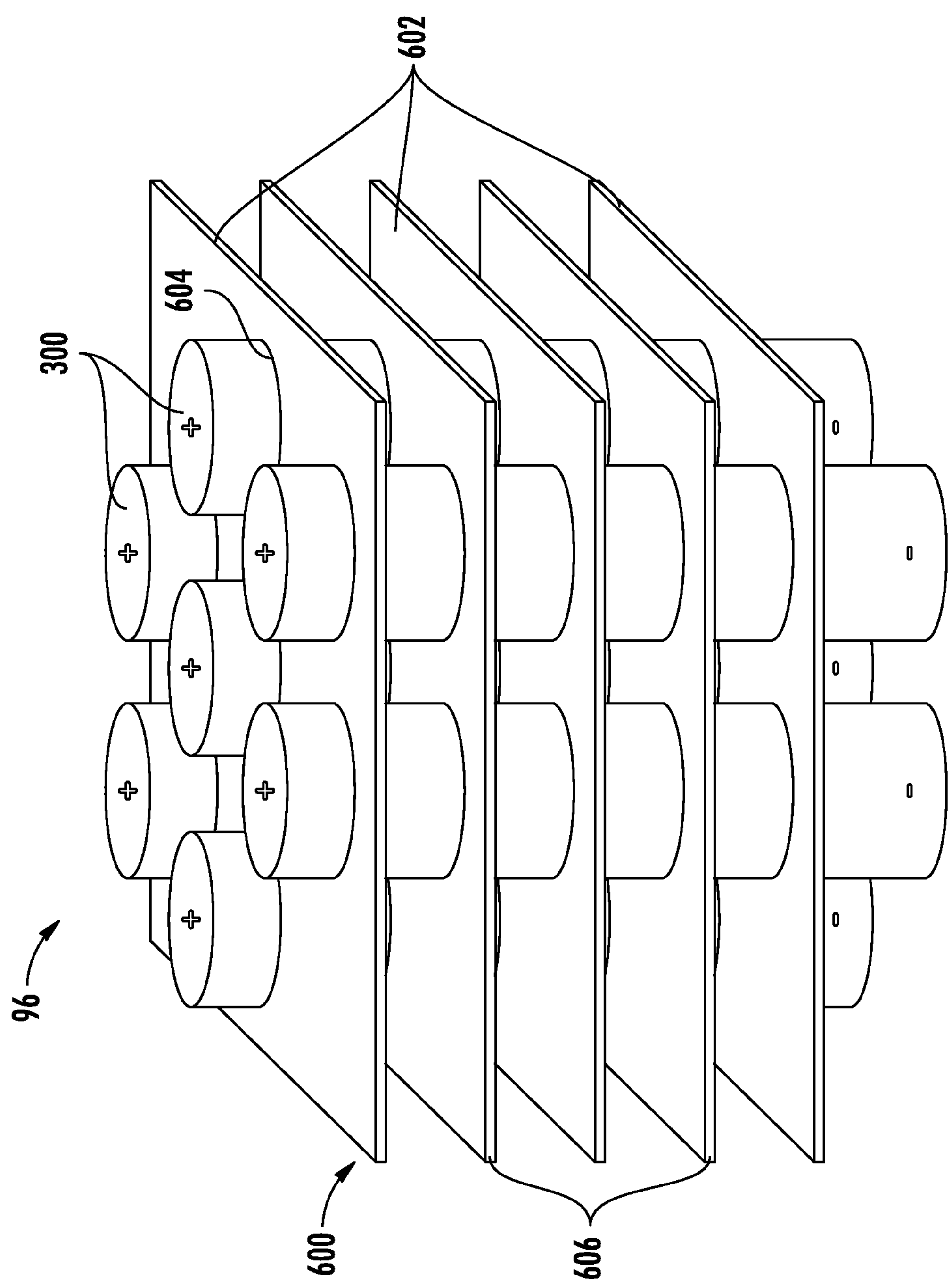
FIG. 6 depicts a battery case for cell packs according to one or more embodiments.

FIG. 6 depicts a battery case for cell packs according to one or more embodiments. The battery case 600 includes a plurality of fins 602 arranged to hold a battery module 96. More specifically, the fins 602 include orifices 604 that extend through each fin 602 that are sized and shaped to receive the cell packs 300 of a battery module 96 in the orientation depicted in FIG. 5. Each of the fins 602 are substantially parallel to each of the other fins 602 and can be connected to each other by one or more vertical supports. The vertical support(s) can be affixed at any location on the fins 602 create air gaps 606 between the fins 602 of the battery case 600.

The battery case 600 allows for air to flow through the air gaps 606 to provide air flow to the cell packs 300. Environmental conditions within a TRU, for example, can change given the mobile nature of TRUs. As environmental conditions change, the cell packs 300 of a battery module 96 can require adjustments to the ambient temperature to avoid hazardous conditions, such as thermal runaway. In one or more embodiments, a fan can be utilized to blow air through the air gaps 606 of the battery case to maintain ambient conditions for the cell packs 300. The fan can be a variable speed fan 84 as depicted in FIG. 2. The battery case 600 including the battery module 96 can be inserted within the refrigeration system 64 while being utilized to power the refrigeration system 64. The location of the battery case 600 within the refrigeration system 64 can be such that conditioned air is passed through the air gaps 606 of the battery case 600. In another embodiment, the air passed through the air gaps 606 of the battery case can be not conditioned air from a variable speed fan 84 or any other fan type. The TRU refrigeration system 64 is just one example of a refrigeration system; in one or more embodiments, the battery case 600 including the cell packs 300 can be used in any type of refrigeration system.

In one or more embodiments, the fins 602 can be any type of material including metal, metal alloy, and the like. Aluminum fins can be utilized due to the thermal conductivity of aluminum. In one or more embodiments, the fins 602 are formed with collars about the orifice to provide thermal contact with the cell packs 300 at the orifice 604 locations. The fin collars also allow for properly spacing adjacent fins to fix the air gap opening. As the cell packs 300 are disposed through the orifices 604 of the fins 602, the orifices 604 are sized and shaped to make this thermal contact with the cell packs 300 around the housing of the cell packs 300. While aluminum is just one example of a material to use for the fins 602, any other material can be utilized for the fins including other high thermal conductivity materials such as copper. The fins can be any configuration such as flat, wavy, or corrugated according to one or more embodiments. The fin spacing can be any type of fin spacing such as, for example, 8 to 14 fins per inch.

While the illustrated battery case 600 depicts the cell packs 300 extending outside the fins 602, in one or more embodiments, the battery case 600 can include fins 602 such that an end fin on each side of the battery case 600 is substantially flush with each end of the cell packs 300 in the battery module 96 to form a cube shaped battery case. While the illustrated example shows only one cell pack extending through an orifice location, in one or more embodiments, two or more cell packs 300 can extend through an orifice 604 location in the battery case.

Figure 7:
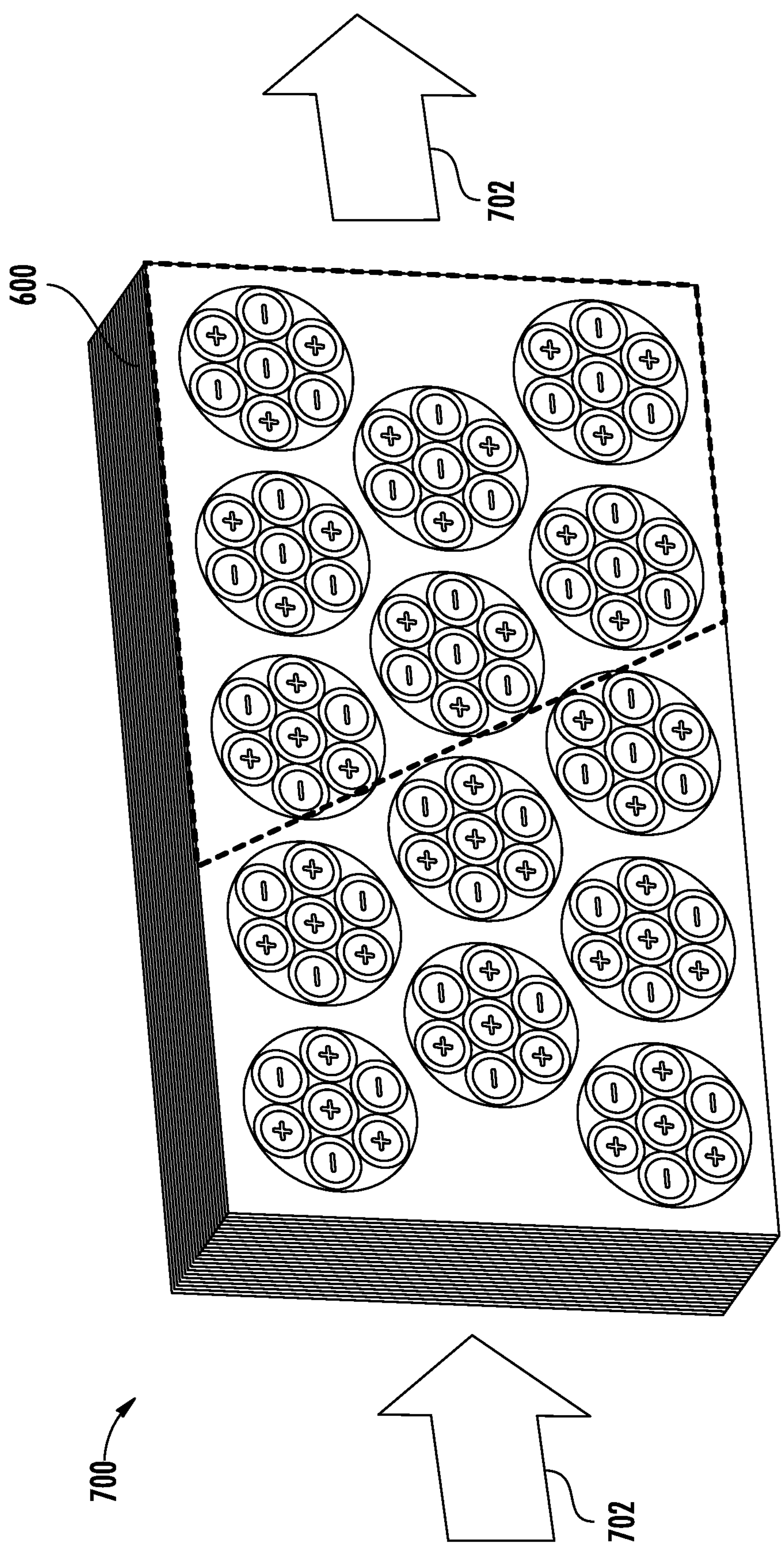
FIG. 7 depicts multiple battery cases arranged to form a battery according to one or more embodiments.

FIG. 7 depicts two battery cases 600 arranged to form a battery 700 according to one or more embodiments. The battery cases 600 can be connected to each other in any shape such as the shape depicted in FIG. 7. Air can flow through each of the battery cases 600 blown from a fan as described herein. The battery cases 600 can be arranged such that roughly half of the battery cases 600 in the battery 700 are utilized as a positive contact and the other half can be utilized as a negative contact. The positive contact and negative contact can be connected to power for a refrigeration system as described herein. In one or more embodiments, the battery 700 can be connected to other batteries to provide larger voltages and/or power output.

Figure 8:
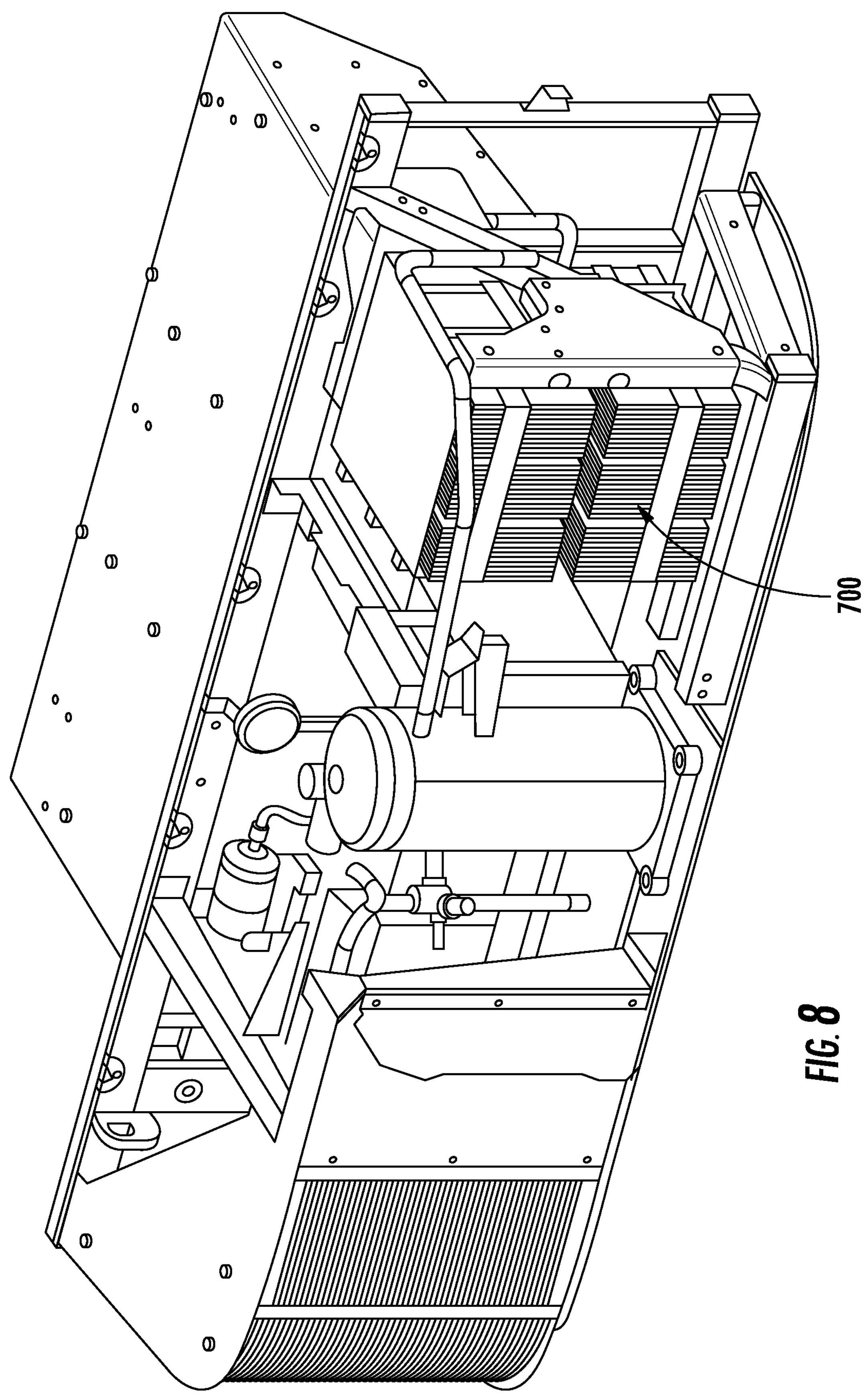
FIG. 8 depicts a truck refrigeration unit with 6 battery cases integrated into the unit according to one or more embodiments.

FIG. 8 depicts a truck refrigeration unit with 6 battery cases, 700, integrated into the unit. Electrically connecting these 6 battery cases together, provides high voltage DC which is converted using power electronics, to 3 phase high voltage AC to power the refrigeration unit as needed.

A detailed description of one or more embodiments of the disclosed apparatus are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A trailer refrigeration unit comprising:

a refrigeration system including at least one compressor, an evaporator, a plurality of battery cell packs, and at least one fan;

a microcontroller circuit configured to operate the refrigeration system; and a battery system providing power to one or more of the compressor and the at least one fan, the battery system being the sole power source for the compressor and the at least one fan, the battery system including:

a first fin and a second fin, wherein the first fin is stacked substantially parallel to the second fin;

wherein the first fin is separated from the second fin by an airgap; and wherein a first battery cell pack of the plurality of battery cell packs is disposed through a first orifice on each of the first fin and the second fin;

wherein the first battery cell pack comprises:

a cylindrical housing, wherein a plurality of battery cells are arranged in the cylindrical housing;

wherein the cylindrical housing has a central, longitudinal housing axis and at least one of the plurality of battery cells has a central, longitudinal battery cell axis, the battery cell axis offset from and parallel to the housing axis.

2. The trailer refrigeration unit of claim 1, wherein the battery system further comprises:

a third fin, wherein the third fin is stacked substantially parallel to the first fin and the second fin;

wherein the third fin is separated from the first fin and the second fin by an airgap; and wherein the first battery cell pack is disposed through an orifice on the third fin.

3. The trailer refrigeration unit of claim 1, wherein the battery system further comprises:

one or more support members affixed to each of the first fin and the second fin.

4. The trailer refrigeration unit of claim 1, further comprising:

an environmental sensor operable to collect an environmental parameter in the trailer refrigeration unit.

5. The trailer refrigeration unit of claim 4, wherein the at least one fan is operable to move air towards the battery system based at least in part on the environmental parameter.

6. The trailer refrigeration unit of claim 1, wherein the first orifice is substantially cylindrical and sized to receive the first battery cell pack.

7. The trailer refrigeration unit of claim 1, wherein the first fin and the second fin comprise a metal.

8. The trailer refrigeration unit of claim 7, wherein the metal is aluminum.

9. The trailer refrigeration unit of claim 1 further comprising:

a second battery cell pack and a third battery cell pack of the plurality of battery cell packs disposed through a second orifice on each of the first fin and the second fin; and the first and the second fin are in thermal contact with the first battery cell pack.

10. The trailer refrigeration unit of claim 1, wherein the trailer refrigeration unit does not include a fuel-based generator.

* * * * *